(12) United States Patent
Gaal, Jr. et al.

(10) Patent No.: US 6,172,159 B1
(45) Date of Patent: Jan. 9, 2001

(54) WATER-REDUCIBLE POLYESTER RESINS AND URETHANE COATINGS PRODUCED THEREFROM

(75) Inventors: Robert J. Gaal, Jr.; Roger W. Heitland, both of St. Louis, MO (US)

(73) Assignee: Accures Corporation, St. Louis, MO (US)

( * ) Notice: Under 35 U.S.C. 154(b), the term of this patent shall be extended for 0 days.

(21) Appl. No.: 09/484,625

(22) Filed: Jan. 18, 2000

(51) Int. Cl.$^7$ ............................. C08J 79/00; C08F 20/00
(52) U.S. Cl. ................. 524/604; 528/272; 528/296; 528/300; 528/301; 528/302; 528/307; 528/308; 524/539; 524/600; 524/601; 524/773; 524/802; 524/843; 525/437; 525/440; 525/444
(58) Field of Search ................. 528/272, 296, 528/300, 301, 302, 307, 308; 524/539, 600, 601, 604, 773, 802, 843; 525/437, 440, 444

(56) References Cited

U.S. PATENT DOCUMENTS

| 3,427,266 | | 2/1969 | Phillips et al. | 260/22 |
|---|---|---|---|---|
| 3,974,115 | * | 8/1976 | Laganis . | |
| 4,145,319 | | 3/1979 | Kuzma | 260/22 |
| 4,217,257 | | 8/1980 | Kuzma | 260/22 |
| 4,340,519 | * | 7/1982 | Kotera et al. | 523/414 |
| 4,360,613 | | 11/1982 | Shimp | 523/416 |
| 4,540,771 | * | 9/1985 | Ambrose et al. | 528/272 |
| 4,714,717 | * | 12/1987 | Londrigan et al. | 521/131 |
| 4,960,828 | * | 10/1990 | Higuchi et al. | 525/162 |
| 5,135,963 | * | 8/1992 | Haeberle | 522/84 |
| 5,326,820 | * | 7/1994 | Hoffmann et al. | 525/123 |
| 5,880,250 | | 3/1999 | Housel et al. | 528/272 |
| 5,962,541 | * | 10/1999 | Peterson et al. | 521/131 |

* cited by examiner

Primary Examiner—Samuel A. Acquah
(74) Attorney, Agent, or Firm—Senniger, Powers, Leavitt & Roedel

(57) ABSTRACT

A water-reducible polyester resin for use in producing urethane coatings comprises the reaction product of:

a) hexahydrophthalic anhydride, trimellitic anhydride or phthalic anhydride;

b) 1,4-cyclohexane dimethanol or trimethylol propane or mixtures thereof; and c) a polyethylene glycol selected from the group consisting of polyethylene glycols, methoxy polyethylene glycols and trifunctional polyethylene glycols having a molecular weight no greater than approximately 1050;

the reaction product having a functionality between approximately 2 and 2.6. Another water-reducible polyester resin comprises the same components and a specified nonionic surfactant. Urethane coatings containing such polyester resins and a diisocyanate are also disclosed.

26 Claims, No Drawings

WATER-REDUCIBLE POLYESTER RESINS AND URETHANE COATINGS PRODUCED THEREFROM

BACKGROUND OF THE INVENTION

This invention relates to water-reducible polyester resins and urethane coatings produced therefrom and, more particularly, to water-reducible polyester resins and urethane coatings which provide improved performance characteristics which render them useful for numerous interior and exterior applications which require a high gloss, good flexibility and excellent solvent resistance.

While two component urethane coatings or polyol-diisocyanate coatings are available, there is a continuing need to develop improved and less expensive water-reducible polyester resins and urethane coatings produced therefrom which exhibit the desired performance properties including low volatile organic components formulations with no hazardous air pollutants, low odor and excellent adhesion in direct to metal application.

SUMMARY OF THE INVENTION

Among the several objects of the invention may be noted the provision of novel water-reducible polyester resins for use in producing urethane coatings; the provision of such polyester resins which comprises the reaction product of an anhydride, a polyol and a polyethylene glycol and which has a functionality between approximately 2 and 2.6 and the reaction product of these same components and a nonionic surfactant; the provision of urethane coatings for various substrates comprised of the reaction product of said water-reducible polyester resins and an aliphatic diisocyanate; and the provision of such urethane coatings which exhibit improved performance properties and are generally less expensive to produce than available urethane coatings. Other objects and features will be in part apparent and in part pointed out hereinafter.

Briefly, the present invention is directed to a water-reducible polyester resin for use in producing urethane coatings which comprises the reaction product of (a) hexahydrophthalic anhydride, trimellitic anhydride or phthalic anhydride; (b) 1,4-cyclohexane dimethanol or trimethylolpropane; and (c) a polyethylene glycol, a methoxy polyethylene glycol or trifunctional polyethylene glycol having a molecular weight no greater than approximately 1050; the reaction product having a functionality between approximately 2 and 2.6. The invention is also directed to such a polyester resin which additionally contains a nonionic surfactant which is a polyoxyalkylene derivative of ethylene glycol, ethylene oxide, propylene glycol and propylene oxide having terminal hydroxy groups and a molecular weight between approximately 300 and 10,000.

The invention is further directed to a urethane coating for substrates which comprises the reaction product of a blend of the two above-noted polyester resin products and an aliphatic diisocyanate such as a trimer of hexamethylene diisocyanate.

DESCRIPTION OF PREFERRED EMBODIMENTS

In accordance with the present invention, it has now been found that improved water-reducible polyester resins for use in producing urethane coatings may be provided by formulating the reaction product of (a) an anhydride which may be hexahydrophthalic anhydride, trimellitic anhydride or phthalic anhydride; (b) a polyol which may be 1,4-cyclohexane dimethanol or trimethylol propane or mixtures thereof; and (c) a polyethylene glycol which may be a polyethylene glycol, methoxy polyethylene glycol or trifunctional polyethylene glycol having a molecular weight no greater than approximately 1050, the reaction product having a functionality between approximately 2 and 2.6, preferably 2.3. The resulting reaction product is a polymer having ester linkages and is water-soluble. The proportions of components (a), (b) and (c) may vary but are selected so as to provide the reaction product with a functionality between approximately 2 and 2.6, i.e. the functionality is the number of carboxyl and hydroxyl groups in the reaction product added together and averaged on a weight basis. In practice, it is preferred that component (a) be constituted by a mixture of hexahydrophthalic anhydride and trimellitic anhydride, but either anhydride or phthalic anhydride may also be employed. As used herein, the term "phthalic anhydride" means phthalic anhydride and related functional isomeric equivalents of phthalic acid. Similarly, it is preferred that a mixture of 1,4-cyclohexane dimethanol and trimethylol propane be used as component (b). With respect to component (c), various polyethylene glycols having a molecular weight no greater than approximately 1050 may be used in the practice of the invention. Preferred for usage are a polyethylene glycol having a molecular weight of approximately 380 to 420 (e.g. Carbowax 400, Union Carbide Corporation) or a trifunctional polyethylene glycol having a molecular weight of approximately 950 to 1050 (e.g. Carbowax 990, Union Carbide Corporation). Other Carbowax polyethylene glycols having a molecular weight no greater than 1050 may be used. It is also preferred that a polyethylene glycol such as Carbowax 400 constitute at least approximately 40% by weight of the polyester resin reaction product produced from components (a), (b) and (c).

In carrying out the invention, components (a), (b) and (c) are loaded into a reactor and heated to approximately 500–530° F., preferably 520° F. The mixture is held at this temperature until an acid value of approximately 6.0 maximum and a viscosity of, for example, $Z_5$–$Z_6$ on the Gardner Holt scale at 100% nonvolatile material are achieved. Water of reaction is removed and the resulting polyester resin reaction product is then cooled and packed off for further use as described below.

In further accordance with the invention, a second polyester resin reaction product is formulated from components (a), (b) and (c) as described above with a fourth component constituted by a nonionic surfactant which may be a polyoxyalkylene derivative of ethylene oxide and ethylene glycol and propylene oxide and propylene glycol having terminal hydroxy groups and a molecular weight between approximately 300 and 10,000, the resulting reaction product again having a functionality between approximately 2 an 2.6, preferably 2.3. Such surfactants have the structure:

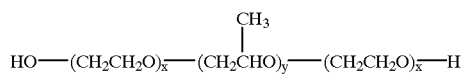

prepared by the controlled addition of propylene oxide to the two hydroxyl groups of propylene glycol to form a hydrophobe followed by the addition of ethylene oxide to sandwich the hydrophobe between hydrophilic groups. Such surfactants may also have the structure:

prepared by adding ethylene oxide to ethylene glycol to provide a hydrophile followed by the addition of propylene oxide to obtain hydrophobic blocks on the outside of the molecule. Thus, for example, the nonionic surfactant may be a polyoxyalkylene derivative of ethylene oxide, propylene oxide and propylene glycol such as Pluronic F108 (molecular weight 3000; 80% ethylene oxide), Pluronic F38 (molecular weight 900; 80% ethylene oxide), Pluronic F68 (molecular weight 1800; 80% ethylene oxide), Pluronic F98 (molecular weight 2700; 80% ethylene oxide), Pluronic F127 (molecular weight 3600; 70% ethylene oxide), or a polyoxyalkylene derivative of propylene oxide, ethylene oxide and ethylene glycol such as Pluronic 10R5 (molecular weight 1000; 50% propylene oxide or Pluronic 17R4 (molecular weight 1700; 40% propylene oxide). All Pluronic surfactants are marketed by BASF. The amount of nonionic surfactant employed is relatively small (e.g. 4.0 weight percent) and its proportion together with the proportions of components (a), (b) and (c) are such that the reaction product has a functionality between approximately 2 and 2.6, preferably 2.3.

In preparing the second polyester resin product, the mixture of components (a), (b), (c) and the nonionic surfactant component is heated to approximately 500–530° F., preferably 520° F. and held at that temperature until an acid value of approximately 6.0 maximum and a viscosity of, for example, $Z_6$–$Z_7$ on the Gardner Holt scale at 100% nonvolatile material are achieved. Water of reaction is removed and the resulting second polyester resin reaction product, a semi-solid in the nature of Vaseline, is cooled and packed off for further use as described below. The incorporation of a nonionic surfactant in the second polyester resin reaction product is important in that it ties into the backbone of the polyester and allows the use of traditional or conventional diisocyanates in the preparation of the urethane coatings as described below, i.e. it is believed that the nonionic surfactant solubilizes the diisocyanate and draws it into the polyester resin reaction products. In the practice of the invention, the first polyester resin reaction product above described and the second polyester resin reaction product containing the nonionic surfact are combined in suitable proportions to form a blend or solution (e.g. 90 parts by weight of the first polyester resin reaction product and 10 parts by weight of the second polyester resin reaction product) which can then be supplied at 100% solids for use in producing urethane coatings.

To produce a clear urethane coating in accordance with the invention, the above-described blend of the first and second polyester resin reaction products is combined in suitable proportions with a diisocyanate, water is added and the pH is adjusted to approximately neutral through the addition of ammonium hydroxide or an amine. For floor coatings, the combination of the polyester resin reaction products and diisocyanate is reduced in water to 60% while for spray applications the combination is reduced to 50% in water. The polyester resin reaction products cross link with the diisocyanate to form urethane coatings which are water-soluble, solvent-free and 100% solids. Various diisocyanates may be employed such as a trimer of hexamethylene diisocyanate (e.g. Tolonate HDT, Rhodia; Desmodur N 3300, Bayer and Luxate HT, Lyondell), isophorone diisocyanate, biuret of hexamethylene diisocyanate, diphenylmethane diisocyanate, tetramethylene diisocyanate, dodecane diisocyanate and 1,4-cyclohexane diisocyanate. The use of aliphatic diisocyanates such as hexamethylene diisocyanate in the practice of the invention is preferred. The combination of the polyester resin reaction products and diisocyanate may be in various proportions, the preferred proportions being 1.5:1 urethane (NCO) to OH (from polyester resin components) or 2:1 NCO to OH.

The urethane coatings produced through the practice of the present invention have many desirable properties which render them suitable for a wide array of applications. Thus, such coatings are flexible and provide for direct metal adhesion to steel and aluminum. The coatings are low in volatile organic components, have no hazardous air pollutants, a low odor, a pot life of four to five hours, good hardness development with overnight cure, high specular gloss, excellent Taber Abrasion Resistance (~23.6 mg loss per 1000 cycles) and excellent flow and leveling. There are thus useful for chemical tank coatings, bridges, water towers, heavy equipment, concrete floor sealers/topcoats, aircraft and marine coatings and other applications.

For pigmented urethane coatings, a slurry of a pigment such as a slurry of $TiO_2$ is prepared in water and then added to the blend of the first and second polyester resin reaction products. The resultant mixture is combined with an aliphatic diisocyanate and further reduced in water for application to various substrates or for other applications. In the case of a $TiO_2$ slurry, for example, white can be tinted off to the desired color after the $TiO_2$ slurry is incorporated in the polyester resin reaction products. Other pigments may also be used.

The following examples illustrate the practice of the invention:

EXAMPLE 1

Hexahydrophthalic anhydride (768 parts by weight), trimellitic anhydride (264 parts by weight), 1,4-cyclohexane dimethanol (591 parts by weight), trimethylol propane (370 parts by weight) and a polyethylene glycol having a molecular weight of approximately 400 (Carbowax 400, Union Carbide; 1645 parts by weight) were loaded into a reactor. The mixture was heated in the reactor to a temperature of 520° F. and held for an acid value of 6.0 maximum and a viscosity of $Z_5$–$Z_6$ on the Gardner Holt scale at 100% nonvolatile material. Water of reaction (138 parts by weight) was removed. The resulting first polyester resin reaction product was cooled and packed off. In this example, calculated on a 100 weight basis, the hexahydrophthalic anhydride provided 0.284 equivalents of COOH groups, the trimellitic anhydride provided 0.119 equivalents of COOH groups, the 1,4-cyclohexane dimethanol provided 0.235 equivalents of OH groups, the trimethylol propane provided 0.235 equivalents of OH groups and the Carbowax 400 also provided 0.235 equivalents of OH groups. The total of the equivalents of COOH and OH groups was 1.108 which averaged on a weight basis gave the first polyester resin reaction product a functionality of 2.3.

Hexahydrophthalic anhydride (737.3 parts by weight) trimellitic anhydride (253.6 parts by weight), 1,4-cyclohexane dimethanol (567.4 parts by weight), trimethylol propane (355.1 parts by weight), a polyethylene-glycol having a molecular weight of approximately 400 (Carbowax 400, Union Carbide; 1579.2 parts by weight), and a nonionic surfactant constituted by a polyoxyalkylene derivative of ethylene glycol having terminal hydroxy groups and a molecular weight of approximately 14,600 (Pluronic F-108, BASF; 139.8 parts by weight) were loaded into a reactor.

The mixture was heated in the reactor to a temperature of 520° F. and held for an acid value of 6.0 maximum and a viscosity of $Z_6$–$Z_7$ on the Gardner Holt scale at 100% nonvolatile material. Water of reaction (132.4 parts by weight) was removed. The resulting second polyester resin reaction product was cooled and packed off. This resin was a semi-solid in the nature of Vaseline.

The first polyester resin reaction product (90 parts by weight) and the second polyester resin reaction product (10 parts by weight) are combined to form a blend in the form of a solution at 100% solids. To form a clear urethane coating, the blend of first and second polyester resin reaction products was combined with a trimer of hexamethylene diisocyanate (Tolonate HDT, Rhodia) in the ratio of 1.5:1 NCO:OH and the resulting urethane coating reaction product was reduced in water to 60% for floor coatings and to 50% for spray applications (e.g. chemical tank coatings, bridges, water towers and heavy equipment).

The resultant high gloss enamel urethane coatings exhibited the following performance characteristics:

Low volatile organic components

No Hazardous air pollutants

Pot Life of four to five hours

Good hardness development with overnight cure

200 MEK (methyl ethyl ketone) double rubs

Excellent adhesion in direct-to-metal application

Excellent flexibility (160 In/Lbs direct and reverse impact in direct-to-metal applications High Specular Gloss (90+ at 60 degree angle)

Excellent Taber Abrasion Resistance (~35 mg/loss per 1000 cycles)

Excellent flow and leveling

EXAMPLE 2

Hexahydrophthalic anhydride (622 parts by weight), trimellitic anhydride (214 parts by weight), 1,4-cyclohexane dimethanol (481 parts by weight), trimethylol propane (300.2 parts by weight) and a polyethylene glycol having a molecular weight of approximately 600 (Carbowax 600, Union Carbide; 1995 parts by weight) were loaded into a reactor. The mixture was heated in the reactor to a temperature of 520° F. and held for an acid value of 6.0 maximum and a viscosity of $Z_4$–2 on the Gardner Holt scale at 99% nonvolatile material. Water of reaction was removed. The resulting first polyester resin reaction product was cooled and packed off.

EXAMPLE 3

Hexahydrophthalic anhydride (310 parts by weight), trimellitic anhydride (107 parts by weight), 1,4-cyclohexane dimethanol (240 parts by weight), trimethylol propane (149 parts by weight) and a polyethylene glycol having a molecular weight of 750 (Carbowax 750, Union Carbide; 1249 parts by weight) were loaded into a reactor. The mixture was heated in the reactor to a temperature of 530° F. and held for an acid value of 6.7 maximum and a viscosity of Y–Z on the Gardner Holt scale at 98.7 nonvolatile material. Water of reaction was removed. The resulting first polyester resin reaction product was cooled and packed off.

EXAMPLE 4

Hexahydrophthalic anhydride (373 parts by weight), trimellitic anhydride (128 parts by weight), 1,4-cyclohexane dimethanol (288 parts by weight), trimethylol propane (179 parts by weight) and a polyethylene glycol having a molecular weight of approximately 550 (Carbowax 550, Union Carbide; 1098 parts by weight) were loaded into a reactor. The mixture was heated in the reactor to a temperature of 525° F. and held for an acid value of 5.4 maximum and a viscosity of $Z_1$–2 on the Gardner Holt scale at 97.9% nonvolatile material. Water of reaction was removed. The resulting first polyester resin reaction product was cooled and packed off.

EXAMPLE 5

Hexahydrophthalic anhydride (300 parts by weight), 1,4-cyclohexane dimethanol (159.8 parts by weight), trimethylol propane (100.1 parts by weight) and a trifunctional polyethylene glycol having a molecular weight of approximately 990 (Carbowax 990, Union Carbide; 732.6 parts by weight) were loaded into a reactor. The mixture was heated in the reactor to a temperature of 510° F. and held for an acid value of 6.0 maximum and a viscosity of $Z_5$–1 on the Gardner Holt scale at 96.8% nonvolatile material. Water of reaction was removed. The resulting first polyester resin reaction product was cooled and packed off.

EXAMPLE 6

Hexahydrophthalic anhydride (421.3 parts by weight), trimellitic anhydride (144.9 parts by weight), 1,4-cyclohexane dimethanol (324.2 parts by weight), trimethylol propane (202.9 parts by weight), a polyethylene glycol having a molecular weight of approximately 400 (Carbowax 400, Union Carbide; 902.4 parts by weight) and a nonionic surfactant constituted by a polyoxyalkylene derivative of propylene oxide, propylene glycol and ethylene oxide having terminal hydroxy groups and a molecular weight of approximately 900 (Pluronic F-38, BASF; 79.9 parts by weight) were loaded into a reactor. The mixture was heated in the reactor to a temperature of 520° F. and held for an acid value of 5.0 maximum and a viscosity of $Z_5$+4 on the Gardner Holt scale at 97.2% nonvolatile material. The resulting second polyester resin reaction product may be blended with the first polyester resin reaction products of Examples 1–5 and the resulting blend used in forming a clear urethane coating as described in Example 1.

EXAMPLE 7

Hexahydrophthalic anhydride (421.3 parts by weight), trimellitic anhydride (144.2 parts by weight), 1,4-cyclohexane dimethanol (324.2 parts by weight), trimethylol propane (202.9 parts by weight), a polyethylene glycol having a molecular weight of approximately 400 (Carbowax 400, Union Carbide; 902.4 parts by weight) and a nonionic surfactant constituted by a polyalkylene derivative of propylene oxide, propylene glycol and ethylene oxide having terminal hydroxy groups and a molecular weight of approximately 3000 (Pluronic L-101, BASF; 79.9 parts by weight) were loaded into a reactor. The mixture was heated in the reactor to a temperature of 530° F. and held for an acid value of 5.7 maximum and a viscosity of $Z_5$+2 on the Gardner Holt scale at 99.3% nonvolatile material. Water of reaction was removed. The resulting second polyester resin reaction product may be blended with the first polyester resin reaction products of Examples 1–5 and the resulting blend used in forming a clear urethane coating as described in Example 1.

EXAMPLE 8

Hexahydrophthalic anhydride (421.3 parts by weight), trimellitic anhydride (144.3 parts by weight), 1,4- cyclohexane dimethanol (324.2 parts by weight), trimethylol propane (202.9 parts by weight), a polyethylene glycol having a molecular weight of 400 (Carbowax 400, Union Carbide; 902.4 parts by weight) and a nonionic surfactant constituted by a polyalkylene derivative of ethylene oxide, ethylene glycol and propylene oxide having terminal hydroxy groups and a molecular weights of 1700 (Pluronic 17R4, BASF; 79.8 parts by weight) were loaded into a reactor. The mixture was heated in the reactor to a temperature of 500° F. and held for an acid value of 6.0 maximum and a viscosity of $Z_5+1$ on the Gardner Holt scale at 100% nonvolatile material. Water of reaction was removed. The resulting second polyester resin reaction product may be blended with the first polyester resin reaction products of Example 1–5 and the resulting blend used in forming a clear urethane coating as described in Example 1.

EXAMPLE 9

Hexahydrophthalic anhydride (204.2 parts by weight), trimellitic anhydride (70.3 parts by weight), 1,4-cyclohexane dimethanol (157.9 parts by weight), trimethylol propane (98.5 parts by weight), a polyethylene glycol having a molecular weight of 600 (Carbowax 600, Union Carbide; 654.7 parts by weight), and a nonionic surfactant constituted by a polyoxyalkylene derivative of propylene oxide, propylene glycol and ethylene oxide having terminal hydroxy groups and a molecular weight of 900 (Pluronic F38, BASF, 47.8 parts by weight) were loaded into a reactor. The mixture was heated in the reactor to a temperature of 515° F. and held for an acid value of 4.5 maximum and a viscosity of $Z_3+3$ on the Gardner Holt scale at 100% nonvolatile material. Water of reaction was removed. The resulting second polyester resin reaction product may be blended with the first polyester resin reaction products of Examples 1–5 and the resulting blend used in forming a clear urethane coating as described in Example 1.

In view of the above, it will be seen that the several objects of the invention are achieved and other advantageous results attained.

As various changes could be made in the above products and processes, without departing from the scope of the invention, it is intended that all matter contained in the above description shall be interpreted as illustrative and not in a limiting sense.

What is claimed is:

1. A water-reducible polyester resin for use in producing urethane coatings comprising the reaction product of:
   a) an anhydride selected from the group consisting of hexahydrophthalic anhydride, trimellitic anhydride and phthalic anhydride;
   b) a polyol selected from the group consisting of 1,4-cyclohexane dimethanol and trimethylol propane or mixtures thereof; and
   c) a polyethylene glycol selected from the group consisting of polyethylene glycols, methoxy polyethylene glycols and trifunctional polyethylene glycols having a molecular weight no greater than approximately 1050;
   said reaction product having a functionality between approximately 2 and 2.6.

2. A water-reducible polyester resin as set forth in claim 1 wherein said polyethylene glycol is a polyethylene glycol having a molecular weight of between approximately 400 and 750.

3. A water-reducible polyester resin as set forth in claim 1 wherein said polyethylene glycol is a methoxy polyethylene glycol having a molecular weight of approximately 750.

4. A water-reducible polyester resin as set forth in claim 1 wherein said polyethylene glycol is a trifunctional polyethylene glycol having a molecular weight of approximately 990.

5. A water-reducible polyester resin for use in producing urethane coatings comprising the reaction product of:
   a) hexahydrophthalic anhydride;
   b) trimellitic anhydride;
   c) 1,4-cyclohexane dimethanol
   d) trimethylol propane; and
   e) a polyethylene glycol having a molecular weight of approximately 400;
   said reaction product having a functionality between approximately 2 and 2.6.

6. A water-reducible polyester resin as set forth in claim 5 wherein said reaction product has a functionality of approximately 2.3.

7. A water-reducible polyester resin as set forth in claim 5 wherein said polyethylene glycol constitutes at least approximately 40% by weight of said reaction product.

8. A water-reducible polyester resin for use in producing urethane coatings comprising the reaction product of:
   a) hexahydrophthalic anhydride;
   b) trimethylol propane; and
   c) a polyethylene glycol having a molecular weight of approximately 400;
   said reaction product having a functionality between approximately 2 and 2.6.

9. A water-reducible polyester resin for use in producing urethane coatings comprising the reaction product of:
   a) trimellitic anhydride;
   b) 1,4-cyclohexane dimethanol;
   c) benzoic acid; and
   d) a polyethylene glycol having a molecular weight of approximately 400;
   said reaction product having a functionality between approximately 2 and 2.6.

10. A water-reducible polyester resin as set forth in claims 8 or 9 wherein said reaction product has a functionality of approximately 2.3.

11. A water-reducible polyester resin as set forth in claim 4 having the following compositions:
   a) approximately 21% by weight of the hexahydrophthalic anhydride;
   b) approximately 7% by weight of trimellitic anhydride;
   c) approximately 16.2% by weight of 1,4-cyclohexane dimethanol;
   d) approximately 10.1% by weight of trimethylol propane;
   e) approximately 40.1% by weight of a polyethylene glycol having a molecular weight of approximately 400; and
   f) the balance water.

12. A water-reducible polyester resin for use in producing urethane coatings comprising the reaction product of:
   a) an anhydride selected from the group consisting of hexahydrophthalic anhydride, trimellitic anhydride and phthalic anhydride;
   b) a polyol selected from the group consisting of 1,4-cyclohexane dimethanol and trimethyol propane;
   c) a polyethylene glycol selected from the group consisting of polyethylene glycols and trifunctional polyethylene glycols having a molecular weight no greater than approximately 1050; and d) a nonionic surfactant which is a polyoxyalkylene derivative of ethylene glycol, ethylene oxide, propylene glycol and propylene oxide having terminal hydroxy groups and a molecular weight between approximately 300 and 10,000;

said reaction product having a functionality between approximately 2 and 2.6.

13. A water-reducible polyester resin as set forth in claim 12 wherein said polyethylene glycol is a polyethylene glycol having a molecular weight of between approximately 400 and 750.

14. A water-reducible polyester resin as set forth in claim 12 wherein said polyethylene glycol is a polyethylene glycol having a molecular weight of approximately 750.

15. A water-reducible polyester resin as set forth in claim 12 wherein said nonionic surfactant is a polyoxyalkylene derivative of ethylene glycol, ethylene oxide and propylene oxide having terminal hydroxy groups and a molecular weight of approximately 900.

16. A water-reducible polyester resin as set forth in claim 12 wherein said nonionic surfactant is a polyoxyalkylene derivative of ethylene glycol, ethylene oxide and propylene oxide having terminal hydroxy groups and a molecular weight of approximately 3,000.

17. A water-reducible polyester resin for use in producing urethane coatings comprising the reaction product of:

a) hexahydrophthalic anhydride;

b) trimellitic anhydride;

c) 1,4-cyclohexane dimethanol d) trimethylol propane;

e) a polyethylene glycol having a molecular weight of approximately 400; and f) a nonionic surfactant constituted by a polyoxyalkylene derivative of ethylene glycol, ethylene oxide and propylene oxide having terminal hydroxy groups and a molecular weight of approximately 3,000;

said reaction product having a functionality between approximately 2 and 2.6.

18. A water-reducible polyester resin as set forth in claim 17 wherein said reaction product has a functionality of approximately 2.3.

19. A water-reducible polyester resin for use in producing urethane coatings comprising a blend of the reaction products of claims 1 and 12, respectively.

20. A water-reducible polyester resin for use in producing urethane coatings as set forth in claim 19 wherein said blend is constituted by 90 parts by weight of the reaction product of claim 1 and 10 parts by weight of the reaction product of claim 12.

21. A urethane coating for substrates comprising the reaction product of:

a) the water-reducible polyester resin of claim 1;

b) the water-reducible polyester resin of claim 12; and c) an diisocyanate.

22. A urethane coating for substrates as set forth in claim 21 wherein said diisocyanate is a trimer of hexamethylene diisocyanate.

23. A urethane coating for substrates as set forth in claim 21 wherein said water-reducible polyester resin of claim 1 and said water-reducible polyester resin of claim 12 are a blend constituted by 90 parts by weight of the reaction product of claim 1 and 10 parts by weight of the reaction product of claim 12.

24. A urethane coating fur substrates as set forth in claim 23 wherein the ratio between said blend of said polyester resin products and said diisocyanate is 1.5NCO:1OH.

25. A urethane coating for substrates as set forth in claim 23 additionally containing a pH adjusting component to adjust the pH of said polyester resin blend in water to approximately neutral.

26. A urethane coating for substrates as set forth in claim 25 wherein said pH adjusting component is ammonium hydroxide.

* * * * *

UNITED STATES PATENT AND TRADEMARK OFFICE
CERTIFICATE OF CORRECTION

PATENT NO. : 6,172,159 B1
DATED : January 9, 2001
INVENTOR(S) : Robert J. Gaal, Jr., et al.

It is certified that error appears in the above-identified patent and that said Letters Patent is hereby corrected as shown below:

The Assignee on the cover of the patent incorrectly states "Accures Corporation" which should read --Accurez Corporation--.

Signed and Sealed this

Third Day of July, 2001

*Attest:*

*Attesting Officer*

NICHOLAS P. GODICI
*Acting Director of the United States Patent and Trademark Office*